US011223605B2

(12) United States Patent
Petit et al.

(10) Patent No.: US 11,223,605 B2
(45) Date of Patent: Jan. 11, 2022

(54) METHOD AND SYSTEM FOR CONNECTED VEHICLE COMMUNICATION

(71) Applicant: Onboard Security, Inc., San Diego, CA (US)

(72) Inventors: Jonathan Petit, North Reading, MA (US); William Whyte, Belmont, MA (US)

(73) Assignee: OnBoard Security, Inc., San Diego, CA (US)

( * ) Notice: Subject to any disclaimer, the term of this patent is extended or adjusted under 35 U.S.C. 154(b) by 340 days.

(21) Appl. No.: 16/350,955

(22) Filed: Feb. 4, 2019

(65) Prior Publication Data

US 2019/0245831 A1   Aug. 8, 2019

Related U.S. Application Data

(60) Provisional application No. 62/709,927, filed on Feb. 5, 2018.

(51) Int. Cl.
*H04L 29/06* (2006.01)
*H04W 4/40* (2018.01)
(Continued)

(52) U.S. Cl.
CPC ...... *H04L 63/0421* (2013.01); *H04L 63/0823* (2013.01); *H04W 4/02* (2013.01);
(Continued)

(58) Field of Classification Search
CPC ............. H04L 63/0421; H04L 63/0823; H04L 63/1475; H04W 4/40; H04W 12/06;
(Continued)

(56) References Cited

U.S. PATENT DOCUMENTS 10,129,716 B1 * 11/2018 Ronnau .................. H04W 4/21
10,425,399 B2 * 9/2019 Kravitz ................ G06F 21/645
(Continued)

OTHER PUBLICATIONS

Vaishali D. Khairnarand Dr. Ketan Kotecha, Performance of Vehicle-to-Vehicle Communication using IEEE 802.11p in Vehicular Ad-hoc Network Environment,International Journal of Network Security & Its Applications (IJNSA), vol. 5, No. 2, Mar. 2013 (Year: 2013).*

*Primary Examiner* — Ghodrat Jamshidi
(74) *Attorney, Agent, or Firm* — Michael F. Taveira

(57) ABSTRACT

The invention is applicable for use in conjunction with a system for connected vehicle communications in which each vehicle in the system is issued a limited number of unique pseudonym certificates that are used by the vehicle to establish trust in messages sent by the vehicle by signing each message with a pseudonym certificate. A method is set forth for selecting a pseudonym certificate for use, from among the vehicle's pseudonym certificates, so as to protect the privacy of the vehicle's activity against attacks by eavesdroppers, including the steps of: tracking and storing vehicle location data; computing, from inputs that include the vehicle location data, the vehicle's relative achievable anonymity in particular geographical regions; prioritizing the pseudonym certificates; and selecting a pseudonym certificate for use from among the pseudonym certificates having a priority that is determined by the relative achievable anonymity for the geographical region in which the certificate is to be used. The method includes authenticating a safety message using the selected pseudonym certificate, and transmitting the authenticated message.

22 Claims, 5 Drawing Sheets

(51) Int. Cl.
*H04W 4/02* (2018.01)
*H04W 12/02* (2009.01)
*H04W 12/106* (2021.01)
*H04W 12/12* (2021.01)
*H04W 12/63* (2021.01)
*H04W 12/67* (2021.01)
*H04W 12/069* (2021.01)

(52) U.S. Cl.
CPC ............. *H04W 4/40* (2018.02); *H04W 12/02* (2013.01); *H04W 12/106* (2021.01); *H04L 63/1475* (2013.01); *H04W 12/069* (2021.01); *H04W 12/12* (2013.01); *H04W 12/63* (2021.01); *H04W 12/67* (2021.01)

(58) Field of Classification Search
CPC ....... H04W 4/02; H04W 12/02; H04W 12/67; H04W 12/63; H04W 12/069; H04W 12/12

See application file for complete search history.

(56) References Cited

U.S. PATENT DOCUMENTS

| | | | |
|---|---|---|---|
| 2003/0135732 A1* | 7/2003 | Vaha-Sipila | H04L 63/0421 |
| | | | 713/156 |
| 2006/0155985 A1* | 7/2006 | Canard | G06Q 20/383 |
| | | | 713/156 |
| 2007/0225912 A1* | 9/2007 | Grush | G07B 15/02 |
| | | | 701/469 |
| 2010/0024042 A1* | 1/2010 | Motahari | G06Q 10/10 |
| | | | 726/26 |
| 2011/0271328 A1 | 11/2011 | Sutton-Shearer | |
| 2012/0197873 A1* | 8/2012 | Uramoto | G08G 1/0112 |
| | | | 707/722 |
| 2017/0187994 A1* | 6/2017 | Tatourian | H04N 7/181 |
| 2017/0222990 A1* | 8/2017 | Romansky | H04L 9/14 |
| 2018/0026949 A1 | 1/2018 | Kimn et al. | |
| 2018/0176209 A1 | 6/2018 | Narayanan et al. | |
| 2018/0242127 A1* | 8/2018 | Kwoczek | H04L 69/14 |
| 2018/0262347 A1* | 9/2018 | Levy | H04L 9/006 |
| 2019/0043347 A1* | 2/2019 | Biehle | G08G 1/0141 |
| 2019/0149523 A1 | 5/2019 | Shin et al. | |
| 2020/0234582 A1* | 7/2020 | Mintz | G08G 1/0968 |

* cited by examiner

METHOD AND SYSTEM FOR CONNECTED VEHICLE COMMUNICATION

RELATED APPLICATION

This application claims priority from U.S. Provisional Patent Application No. 62/709,927 filed Feb. 5, 2018, and said Provisional Patent Application is incorporated herein by reference.

FIELD OF THE INVENTION

This invention relates to the field of connected vehicle communication and, more particularly, to a system and technique that provides security and privacy for connected vehicle communication.

BACKGROUND OF THE INVENTION

A part of the background hereof is disclosed in W. Whyte, A. Weimerskirch, V. Kumar, and T. Hehn, "A Security Credential Management System For V2V Communications", IEEE Vehicular Networking Conference, 2013. (The security credential management system described therein is sometimes referred to as "SCMS.") The SCMS for vehicle-to-vehicle ("V2V") communication was developed under a cooperative agreement with the US Department of Transportation. The system issues digital certificates to participating vehicles for establishing trust among them, which is necessary for safety applications primarily crash-avoidance. It supports four main use cases, namely, bootstrapping, certificate provisionary, misbehavior reporting and revocation. A stated design goal thereof was to provide both security and privacy to the largest extent reasonable and possible. To achieve the latter, vehicles are issued pseudonym certificates, and the provisioning of those certificates is divided among multiple semi-autonomous "organizations". A stated challenge was to facilitate efficient revocation of certificates while providing security and privacy against attacks from insiders.

An important feature of the SCMS is that in order to support privacy against an insider at the SCMS (so that an insider can't tell which credentials belong to a particular car, or even which credentials belong to each other) while still allowing a misbehaving vehicle to be identified and revoked, a complicated architecture has been put in place where no less than four SCMS component organizations (a Pseudonym Certificate Authority (PCA), a Registration Authority (RA), and two Linkage Authorities (LAs)) participate in issuing each certificate.

A challenge in a vehicle credential management system is to maintain the privacy of individual vehicles while still enabling efficient revocation of misbehaving vehicles. In the Security Credential Management System, SCMS provisions multiple, concurrently valid pseudonym certificates to each participating vehicle in the system. Each pseudonym certificate issued to a vehicle contains a random looking linkage value (as opposed to publicly identifiable information) that can be used for authentication. While the linkage value in each certificate is different, all the linkage values for a vehicle are derived from the same initial linkage seed. At any time, a "sufficient" number of pseudonym certificates are issued to each vehicle so that, ideally, minimal "re-use" of a certificate is required. Intuitively, this is to ensure privacy of a vehicle across multiple authentications. The number of certificates and linkage values needed to be generated is obviously very large.

A vehicle's behavior may deviate from normal either due to malfunction (of some sensors, for example), or due to intentional misbehavior, and it may not always be easy to distinguish between the two. In SCMS a vehicle is, therefore, revoked only if it exhibits sustained abnormal behavior. In the SCMS, misbehavior identification involves an organization entity called Misbehavior Authority (MA) on top of the four organizations summarized above as being involved in linkage value generation. At a high level, MA collects misbehavior reports from vehicles. On a regular basis, it processes these reports and creates lists of pseudonym certificates that it wants to gather more information on. For suspect pseudonym certificates, it is primarily interested in knowing how many (and which) certificates belong to one vehicle, and for reporter pseudonym certificates, it wants to learn how many unique vehicles are present in a given set of pseudonym certificates. To this end, MA sends linkage values to PCA and gets back the corresponding pre-linkage values. Then, it sends those pre-linkage values to one of the Linkage Authorities (LAs) to get back correlations among them. Then, for vehicles that need to be revoked (as determined by MA), it requests the corresponding linkage seeds for the current time period from both of the LAs, and publishes them on the Certificate Revocation List (CRL). Using the published seeds, anyone can generate all current and future (but not past) linkage values and compare them with the ones in the certificates to identify revoked vehicles.

From the foregoing, it will be understood that it takes substantial resources to generate, store, and communicate pseudonym certificates for the very large number of vehicles potentially in a connected vehicle system. As a consequence, it has been proposed, for example, to have the SCMS limit the number of pseudonyms issued to a vehicle to a number such as 20 per week.

In the proposed U.S. connected vehicle system, vehicles equipped with a Dedicated Short Range Communications (DSRC) device will broadcast a location beacon as often as once every 100 milliseconds. These location beacons (called "Basic Safety Messages" in the US standard SAEJ2735) are digitally signed following the IEEE 1609.2 standard, with each signature authenticated by a digital pseudonym certificate of the type described above. All certificates are unique, so if two messages are signed with the same certificate, an observer can conclude that they came from the same vehicle, even if the two messages are widely separated in space and time.

To prevent long-term location tracking (and inference of personally identifiable information, such as the activity of the vehicle operator), vehicles are provisioned with a number of certificates (and the corresponding private keys used for signing) that are simultaneously valid over the course of a week. The existing plan is for vehicles to change their pseudonym certificate from time to time according to pseudonym change strategy. To ensure an optimal level of location privacy, the pseudonym change strategy has to select a new pseudonym according to a set of rules (e.g. temporal, spatial). The goal of the pseudonym change strategy is to minimize the information that is learned about which certificates go together by an eavesdropper who only sees dispersed messages.

The pseudonym change strategy's job is made harder by the fact that it is proposed to limit the number of pseudonyms issued to a vehicle to a number like 20 a week. The current proposal for pseudonym change in SAE J2945/1 is that a pseudonym should be changed every five minutes, which will cause a device to run out of "fresh" pseudonyms after 100 minutes of driving. However, the 2009 National Household Travel Survey indicate that the average adult spends 56 minutes per day driving a private vehicle (this figure is down from 63 minutes a day in 2001 and, although more recent figures are not available, the driving time would be expected to have gone up as the economy improved). At this rate, the vehicle would have to re-use certificates after two days of a seven-day week.

It is among the objects hereof to improve efficiency, security, and privacy in security credential management systems and methods, and to address limitations and shortcomings of prior art approaches including, but not limited to, those treated above.

SUMMARY OF THE INVENTION

The present invention is directed to a method and system for connected vehicle communication that substantially enhances privacy, security, and efficiency of vehicles in the system by improving the generation and transmission of authenticated safety message signals transmitted and received by such vehicles.

The present invention is applicable for use in conjunction with a system for connected vehicle communications in which each vehicle in the system is issued a limited number of unique pseudonym certificates that are used by the vehicle to establish trust in messages sent by the vehicle by signing each message with a pseudonym certificate. A method is set forth for selecting a pseudonym certificate for use, from among the vehicle's pseudonym certificates, so as to protect the privacy of the vehicle's activity against attacks by eavesdroppers, comprising the following steps: tracking and storing vehicle location data; computing, from inputs that include said vehicle location data, the vehicle's relative achievable anonymity in particular geographical regions; prioritizing the pseudonym certificates; and selecting a pseudonym certificate for use from among the pseudonym certificates having a priority that is determined by the relative achievable anonymity for the geographical region in which the certificate is to be used. The method includes authenticating a safety message using the selected pseudonym certificate, and transmitting the authenticated message.

In an embodiment of the invention, the step of prioritizing the pseudonym certificates comprises partitioning the pseudonym certificates into a plurality of privacy risk groups, each of which reflects the privacy risk associated with the pseudonym certificates in the group. In this embodiment, said step of selecting a pseudonym certificate includes selecting a pseudonym certificate from a relatively high privacy risk group when the relative achievable anonymity is relatively low, and selecting a pseudonym certificate from a relatively low privacy risk group when the relative achievable anonymity is relatively high. In this embodiment, the vehicle location data also includes inputs provided by the vehicle operator, inputs derived from messages received from other vehicles in the system, and information regarding the route traveled by the vehicle. In this embodiment, the vehicle location data also includes information regarding the time associated with the vehicle location.

In a further embodiment of the invention, the step of partitioning the pseudonym certificates comprises partitioning certificates into privacy risk groups including at least a privacy risk group of previously used pseudonym certificates and a privacy risk group of unused pseudonym certificates. In this embodiment, the partitioning of the pseudonym certificates further comprises partitioning said group of relatively higher risk used pseudonym certificates into further gradations of relative risk depending on the number of times the respective pseudonym certificates have been previously used at different geographical locations. Also in this embodiment, the step of partitioning said pseudonym certificates includes, for said group of previously used pseudonym certificates, an indication of the particular geographical region in which each said previously used pseudonym certificate was used, and said step of selecting a pseudonym certificate includes selecting a used certificate with an indication of a particular geographical region when the vehicle is in said particular geographical region.

Further features and advantages of the invention will become more readily apparent from the following detailed description when taken in conjunction with the accompanying drawings.

DETAILED DESCRIPTION

Figure 1:
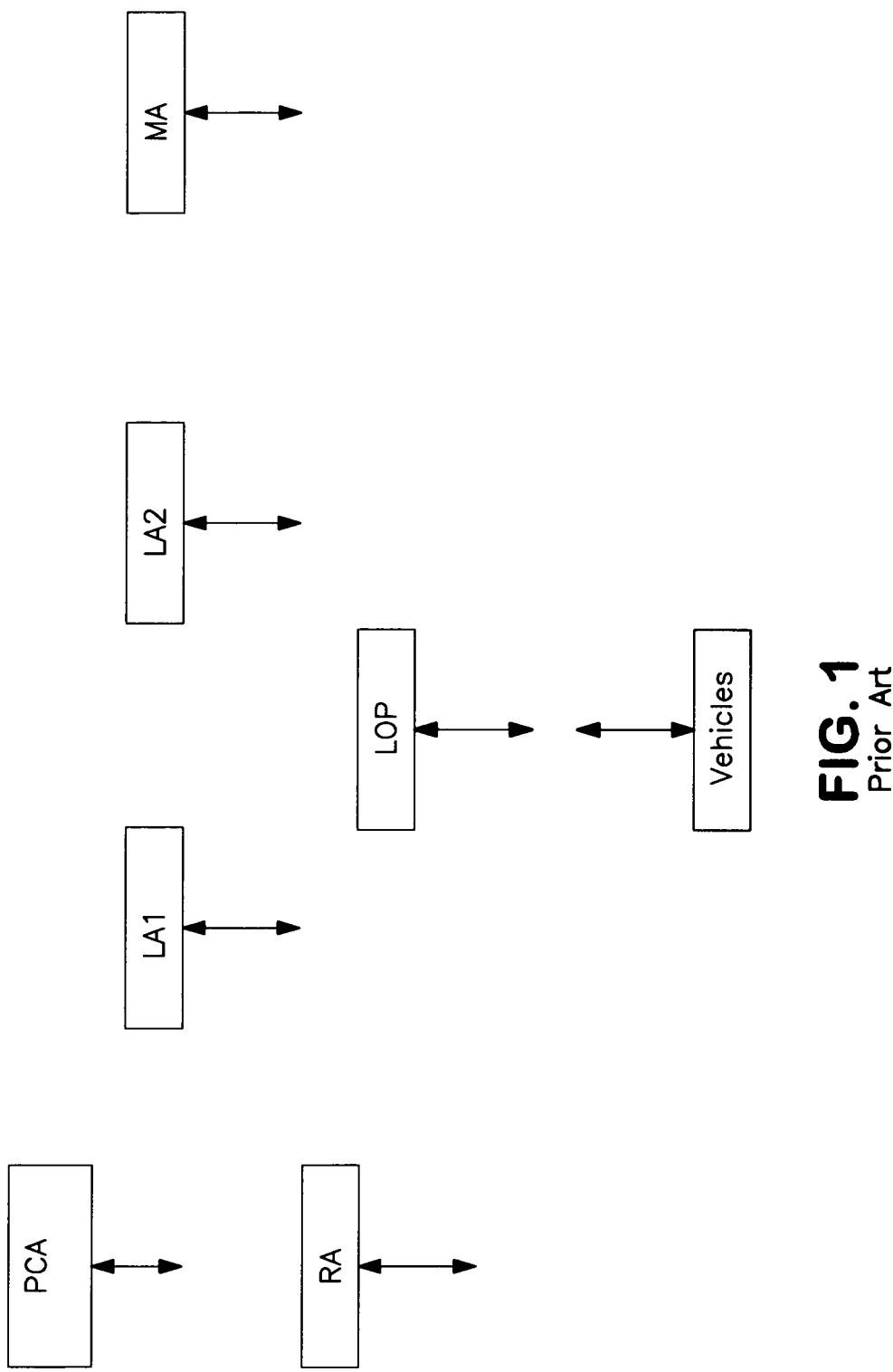
FIG. 1 is a simplified block diagram of a prior art security credential management system for vehicle-to-vehicle communication.

FIG. 1 is a simplified diagram of portions of the Security Credential Management System (SCMS) as disclosed in Whyte et al., 2013, supra, incorporated herein by reference. (An updated version of the SCMS is disclosed in Benedikt Brecht, Dean Therriault, Andre Weimerskirch, William Whyte, Virendra Kumar, Thorsten Hehn, and Roy Goudy. "A Security Credential Management System for V2X Communications." In IEEE Transactions on Intelligent Transportation Systems, pp. 1022, 2018, which maintains, for the most part, the general nature of the SCMS described in the 2013 document.) Reference can be made to the published documents for a thorough understanding of the SCMS, the simplified version of FIG. 1 being useful for understanding the background and context hereof.

In FIG. 1, the Pseudonym Certificate Authority (PCA) issues pseudonym certificates to devices (especially, vehicles). The Registration Authority (RA) validates, processes, and forwards requests for pseudonym certificates to the Pseudonym Certificate Authority. The Misbehavior Authority (MA) processes misbehavior reports to identify potential misbehavior by devices and, if necessary, revokes and adds devices to a Certificate Revocation List (not shown). It also initiates the process of linking a certificate identifier to the corresponding enrollment certificates, and adding the enrollment certificate to an internal blacklist. The Linkage Authority (LA) generates linkage values which are used in the certificates and support efficient revocation. There are two LAs in the SCMS, referred to as LA1 and LA2. The splitting prevents the operator of an LA from linking certificates belonging to a particular device. The location Obscurer Proxy (LOP) hides the location of the requesting device by changing source addresses, and thus prevents linking of network addresses to locations. Additionally, when forwarding information to the Misbehavior Authority (MA), the LOP shuffles the reports to prevent the MA from determining the routes of vehicles reporting misbehavior.

As described in the SCMS documents, each vehicle in the system is periodically provisioned by the SCMS with a pool of pseudonym certificates that respectively contain unique random-looking linkage values that can be used for authentication. While the linkage value in each certification is different, all the linkage values for a particular vehicle are derived from same initial linkage seed pair. As was described above, although, theoretically, a "sufficient" number of pseudonym certificates are issued to each vehicle, analysis shows that substantial "re-use" of certificates will often be needed for normal driving activities, and such re-use can render the vehicle susceptible to compromised privacy, resulting from attacks by eavesdroppers.

Figure 2:
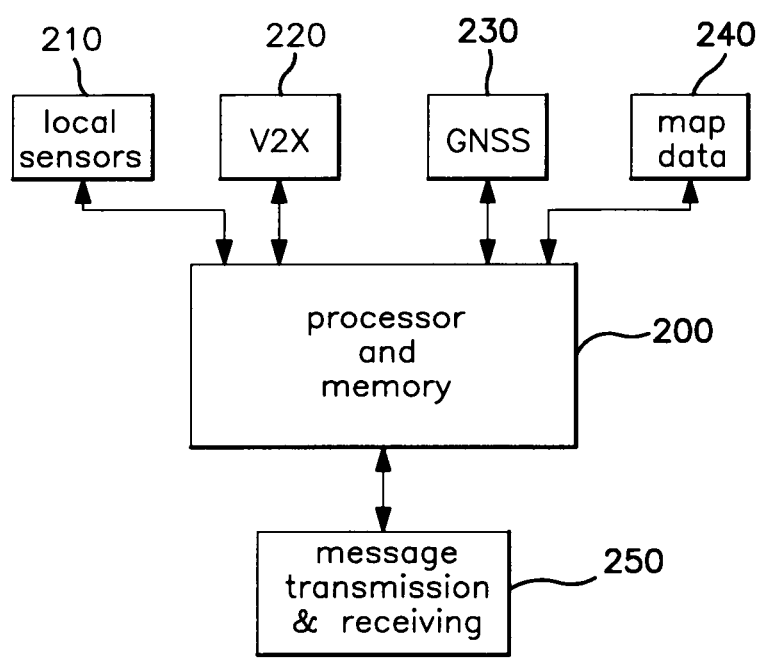
FIG. 2 is a block diagram of a vehicle's On Board Unit (OBU).

FIG. 2 is a block diagram of a vehicle On Board Unit ("OBU"), shown in conjunction with some of the operational subsystems and components of a typical vehicle in the SCMS system. Reference can also be made to SAE specification J2945, which sets forth On Board System Requirements for V2V Safety Communications. The central processor unit and memory of the OBU are represented generally at 200. Interacting therewith are, typically, local sensors 210 (including cameras), V2X communication module 220, global navigation satellite system ("GNSS") 230, map data module 240, and message transmission and receiving subsystem 250. The processor subsystem 200 conventionally includes security services capability for changing pseudonym certificate and identifiers to be used, and for the signing of messages to be transmitted. Certificate selection capability is also provided although, currently, this involves little more than using fresh pseudonym certificates until they run out and then re-using, with possibly taking into account modified certificate use at the beginning and end of common routes.

Figure 3:
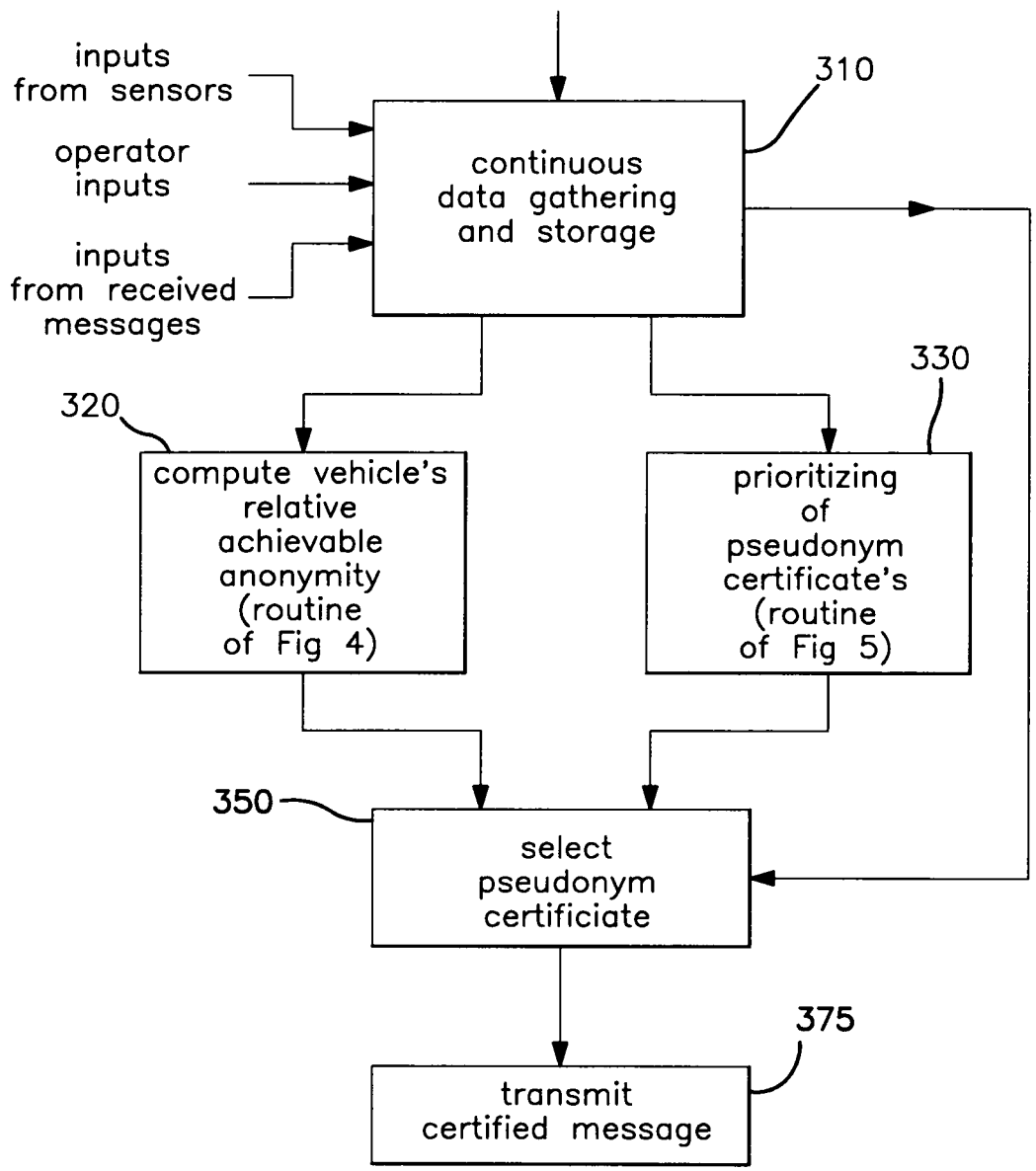
FIG. 3 is a flow diagram of a routine for controlling a processor, such as the processor of the OBU, to advantageously select a pseudonym certificate for use at a particular geographical location in accordance with an embodiment of the invention.

FIG. 3 is a flow diagram of a routine for controlling a processor, such as the processor of the OBS, to advantageously select a pseudonym certificate for use at a particular geographical region, in accordance with an embodiment of the invention. The block 310 represents the data gathering and storage at the vehicle, at least during vehicle operation. Inputs include, but are not limited to: inputs from vehicle sensors, as well as the units and subsystems represented in FIG. 2; inputs from the vehicle operator and/or passengers, before, during, and/or after vehicle operation; and inputs and information gleaned from received messages.

Figure 4:
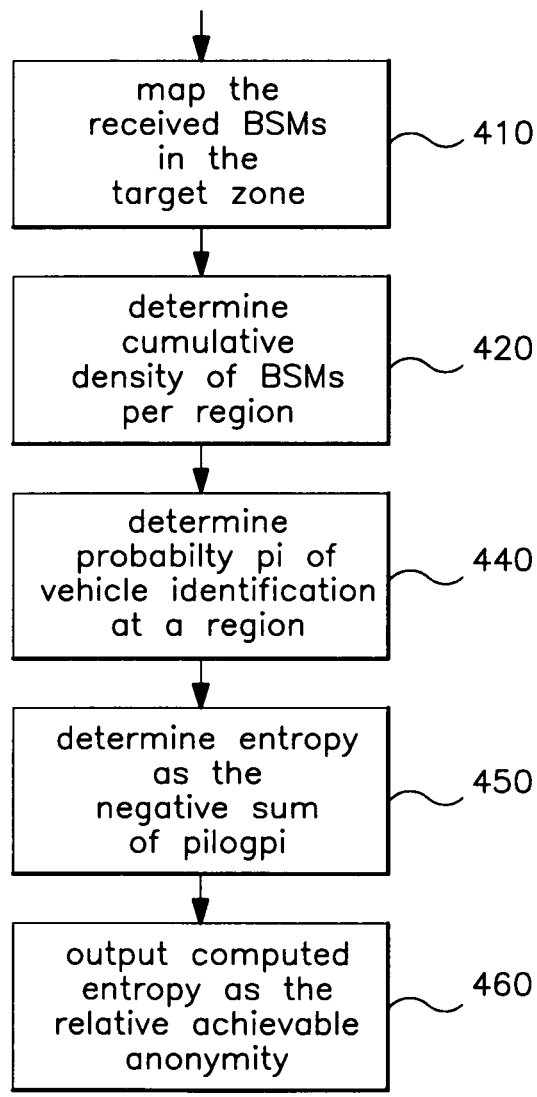
FIG. 4 is a flow diagram of an example of a routine represented by the block 320 of FIG. 3 for computing the vehicle's relative achievable anonymity for a particular geographical location.
Figure 5:
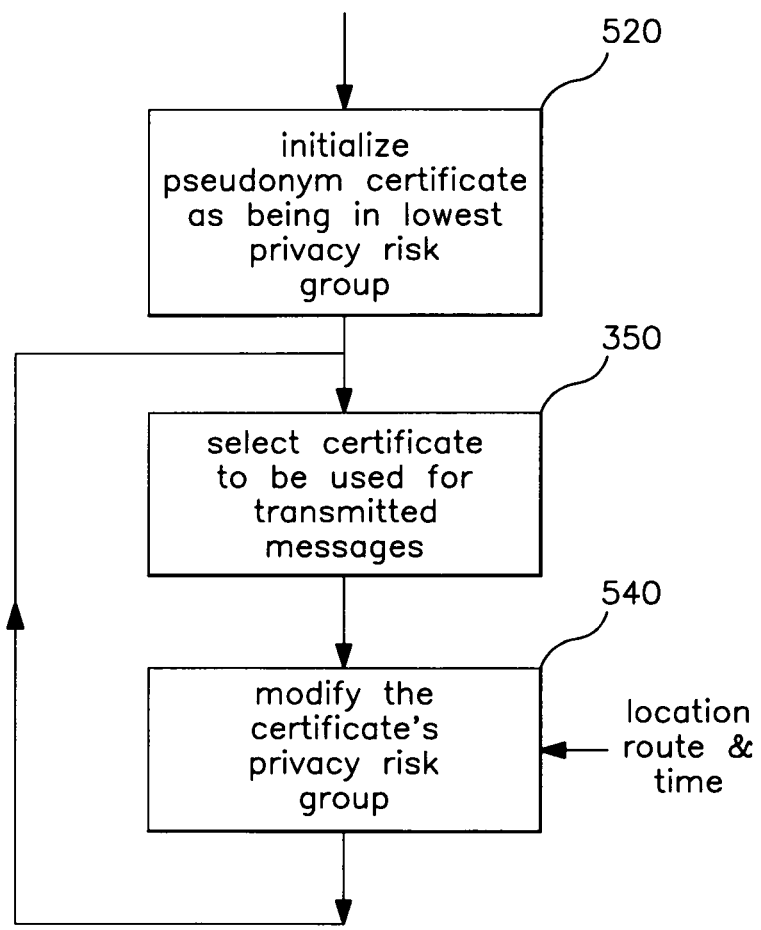
FIG. 5 is a flow diagram of an example of a routine represented by the block 330 of FIG. 3 for prioritizing pseudonym certificates in accordance with an embodiment of the invention.

The blocks 320 and 330 respectively represent computing, from inputs including the vehicle location data, the vehicle's relative achievable anonymity in particular geographical regions (referencing the routine of FIG. 4), and the prioritizing of the vehicle's pseudonym certificates (referencing the routine of FIG. 5). The prioritizing can comprise partitioning of the certificates into a plurality of privacy risk groups. Then, as represented by block 350, the pseudonym certificate to be used from among the pseudonym certificates having a priority that is determined by the relative achievable anonymity for the geographical region in which the certificate is to be used. This includes selecting a certificate from a relatively high privacy risk group when the relative achievable anonymity is relatively low, and selecting a certificate from a relatively low privacy risk group when the relative achievable anonymity is relatively high. The message can then be signed and transmitted, as represented by the block 375.

FIG. 4 is a flow diagram of an example of a routine for the block 320 of FIG. 3 for computing the vehicle's relative achievable anonymity. The vehicle's entropy, at a particular geographical location, is a measure of how much an eavesdropper learns from drawing a sample of information (e.g. from a BSM transmitted from the vehicle) from a given probability distribution p (that is, the entropy is a measure of the degree of unpredictability of the probability distribution). In this example, the vehicle OBU can utilize, inter alia, information from the received messages, such as BSMs (input to block 310 of FIG. 3) that have been sent from vehicles within a target zone. In the diagram, the block 410 represents the mapping of vehicle locations indicated in messages from vehicles in the target zone, and the block 420 represents determination of cumulative density of the vehicle locations per region. Then, as represented by the block 440, determinations are made regarding the probabilities $p_i$ of vehicle identification in the region, which can take into account the time at location, and the measure of entropy (block 450) which will be a number between zero (no unpredictability) and one (maximum unpredictability) that is computed as the negative of the summation of $p_i \log p_i$. (The quantities being summed all have negative values, since each log of a fractional probability will be a negative value.) The computed entropy is, in this exemplary embodiment, output (block 460) as the relative achievable anonymity.

As a simplified example of a further feature, consider a situation where a vehicle, called Vehicle 1, has a pool of 20 pseudonym certificates valid for a week, and Vehicle 1 has a home at location h1, and works at location w1. The system either receives an operator input that specifies these two locations as home and work; or learns from route traces where home and work are. Say the system assigns a pseudonym certificate $c_1$ to h1 and w1 two locations as home and work; or learns from route traces where home and work are. Say the system assigns a pseudonym certificate $c_1$ to h1 and w1 (note that the system could assign different pseudonym certificates to h1 and w1). This means that when Vehicle 1 enters h1 or w1 region (region can be defined, for example, as a circle of a given radius, such as a circle of radius 1 mile centered on h1, respectively w1), it triggers a pseudonym change (i.e. next messages to be sent should be signed with $c_1$) until Vehicle 1 exits the region, where Vehicle 1 will use another pseudonym certificate.

Consider further a scenario where the system learns locations where pseudonym certificates can be reused based on the level of anonymity. Using route traces of, say, a week, Vehicle 1 (V1) computes the location with low level of anonymity. Say the V1 spends 12 consecutive hours at location h1 and 8 consecutive hours at location w1 every day. Therefore, by considering idle time, h1 and w1 would be considered as having low anonymity.

FIG. 5 is a flow diagram of an example of a routine of the block 330 of FIG. 3 for prioritizing the pseudonym certificates in accordance with an embodiment of the invention. Although there are various suitable ways in which the pseudonym certificates can be prioritized, in the present exemplary embodiment, the pseudonym certificates are partitioned in accordance with their use history, supplemented with further prioritization based on location and/or route of prior use. As represented by block 520 of the Figure, the pseudonym certificates to be prioritized are initialized as being in the lowest privacy risk group. The pseudonym certificate to be used next for transmitting messages is selected (block 350 of FIG. 3), and the privacy risk group for that certificate is modified to reflect the latest use thereof. Input relating to location, route and time of use can also be stored in conjunction with the certificate identifier, and used in certificate prioritizing. In conjunction with embodiments hereof, either user-input or self-learned favorite places (e.g. home, or job, or hobby) can be tagged for a single or respective single certificates of relatively low privacy risk group(s) (since eavesdropper can readily track at such locations, e.g. via camera or frequency of message occurrences). A preferred partitioning routine partitions its set of certificates into an as-large-as-possible set that is used in the high anonymity achievable locations and an as-small-as-possible set that is used in the low anonymity achievable locations, and allows for one pseudonym certificate to be assigned to multiple regions. Two triggers can be utilized, namely (a) the application wants to change its certificate but it is detected that the vehicle is too close to a known region (thus a potential waste of a certificate); (b) the current location is detected to be within a known region.

It will be understood that pseudonym certificates (and their associated linkage values) as described herein, can alternatively be described as pseudonym certificate signals, since the processors which produce them will typically, although not necessarily, be electronic processors that produce, store, transmit, and/or receive values as electronic digital bitstreams. Also, it will be understood that while an embodiment of the invention has been described in the context of the SCMS system and implementation by an OBU, the invention can alternatively be practiced in other suitable systems and using one or more local or remote processors.

The invention claimed is:

1. A computer-implemented method for selecting a pseudonym certificate for vehicle-to-vehicle communication, the method comprising:
    tracking and storing location data corresponding to a vehicle;
    determining, based on one or more received basic safety messages, a mapping of one or more other vehicle locations;
    computing, based at least on the location data and the mapping of the one or more other vehicle locations, a relative achievable anonymity associated with the vehicle in a particular geographical region;
    prioritizing a plurality of pseudonym certificates; and
    selecting a pseudonym certificate for use from the plurality of pseudonym certificates having a priority that is determined by the relative achievable anonymity for the particular geographical region;
    wherein prioritizing the plurality of pseudonym certificates is based on a number of times a respective pseudonym certificates from the plurality of pseudonym certificates has been used at a geographical location.

2. The method of claim 1, wherein prioritizing the plurality of pseudonym certificates comprises partitioning the plurality of pseudonym certificates into a plurality of privacy risk groups.

3. The method of claim 2, wherein the pseudonym certificate is selected from a relatively high privacy risk group from the plurality of privacy risk groups when the relative achievable anonymity is relatively low.

4. The method of claim 2, wherein the plurality of privacy risk groups includes a privacy risk group of previously used pseudonym certificates and a privacy risk group of unused pseudonym certificates.

5. The method of claim 2, wherein the pseudonym certificate is selected from a relatively low privacy risk group from the plurality of privacy risk groups when the relative achievable anonymity is relatively high.

6. The method of claim 1, further comprising:
    authenticating a safety message using the pseudonym certificate; and
    transmitting the authenticated safety message.

7. The method of claim 1, wherein the location data corresponding to the vehicle is based on inputs provided by a vehicle operator.

8. The method of claim 1, wherein the location data corresponding to the vehicle is based on information associated with one or more routes traveled by the vehicle.

9. The method of claim 1, wherein the location data corresponding to the vehicle includes information regarding an amount of time associated with a vehicle location.

10. The method of claim 1, wherein computing a relative achievable anonymity comprises computing entropy of a region to be occupied by the vehicle.

11. The method of claim 1, wherein the selected pseudonym certificate includes an indication of prior use in the particular geographical.

12. An apparatus for selecting a pseudonym certificate for vehicle-to-vehicle communication, comprising:
    at least one memory; and
    at least one processor coupled to the at least one memory and configured to:
        track and store location data corresponding to a vehicle;
        determine, based on one or more received basic safety messages, a mapping of one or more other vehicle locations;
        compute, based at least on the location data and the mapping of the one or more other vehicle locations, a relative achievable anonymity associated with the vehicle in a particular geographical region; and
        selecting a pseudonym certificate for use from a plurality of pseudonym certificates having a priority that is based on the relative achievable anonymity for the particular geographical region;
        wherein the priority of the pseudonym certificate is further based on a number of times the pseudonym certificate has been used at the particular geographic region.

13. The apparatus of claim 12, wherein the pseudonym certificate is selected from a group of pseudonym certificates associated with a high privacy risk when the relative achievable anonymity is relatively low.

14. The apparatus of claim 12, wherein the pseudonym certificate is selected from a group of pseudonym certificates associated with a low privacy risk when the relative achievable anonymity is relatively high.

15. The apparatus of claim 12, wherein the location data corresponding to the vehicle is based on information associated with one or more routes traveled by the vehicle.

16. The apparatus of claim 12, wherein the location data corresponding to the vehicle includes information regarding an amount of time associated with a vehicle location.

17. The apparatus of claim 12, wherein each of the plurality of pseudonym certificates includes an indication of use in one or more geographic regions.

18. An apparatus for selecting a pseudonym certificate for vehicle-to-vehicle communication, comprising:

at least one memory; and at least one processor coupled to the at least one memory and configured to:

track and store location data corresponding to a vehicle;

determine, based on one or more received basic safety messages, a mapping of one or more other vehicle locations;

compute, based at least on the location data and the mapping of the one or more other vehicle locations, a relative achievable anonymity associated with the vehicle in a particular geographical region; and selecting a pseudonym certificate for use from a plurality of pseudonym certificates having a priority that is based on the relative achievable anonymity for the particular geographical region;

wherein the pseudonym certificate is selected from a group of pseudonym certificates associated with (i) a low privacy risk when the relative achievable anonymity is relatively high or (ii) a high privacy risk when the relative achievable anonymity is relatively low.

19. The apparatus of claim 18, wherein the priority of the pseudonym certificate is further based on a number of times the pseudonym certificate has been used at the particular geographic region.

20. The apparatus of claim 18, wherein the location data corresponding to the vehicle is based on information associated with one or more routes traveled by the vehicle.

21. The apparatus of claim 18, wherein the location data corresponding to the vehicle includes information regarding an amount of time associated with a vehicle location.

22. The apparatus of claim 18, wherein each of the plurality of pseudonym certificates includes an indication of use in one or more geographic regions.

\* \* \* \* \*